April 4, 1939.  J. SCHINDEL  2,152,977
AUTOMATIC LOCK NUT
Filed Aug. 1, 1936
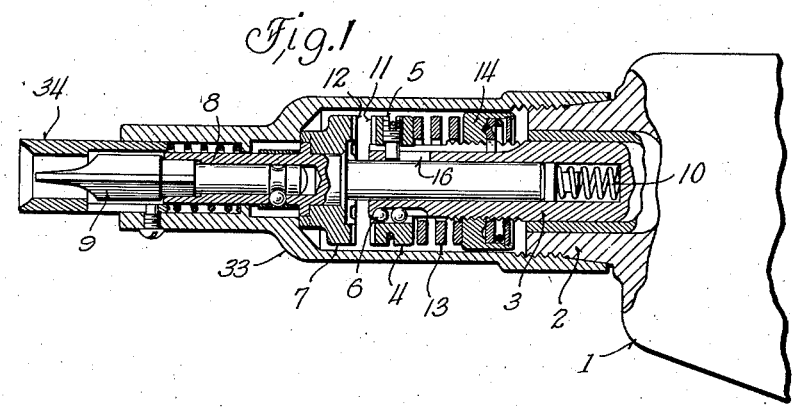
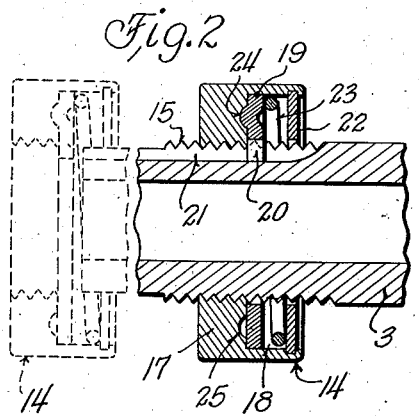
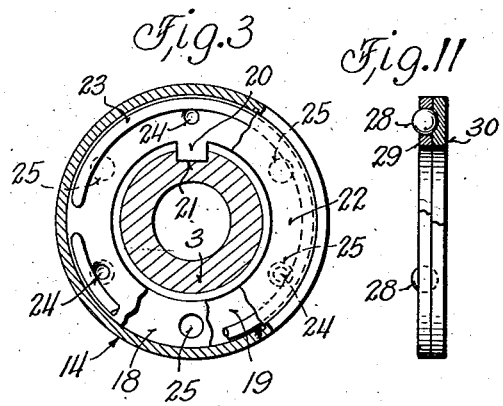
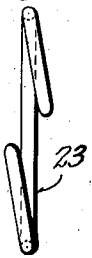
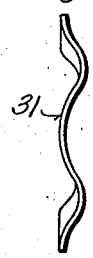
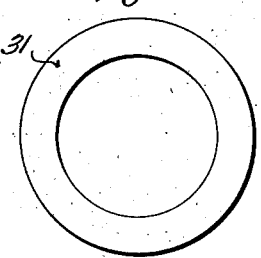
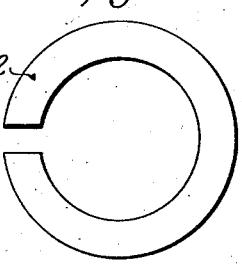
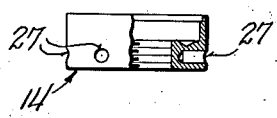
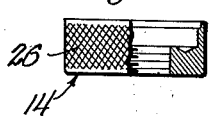
INVENTOR.
JOHN SCHINDEL
BY
ATTORNEY.

Patented Apr. 4, 1939

2,152,977

UNITED STATES PATENT OFFICE 2,152,977

AUTOMATIC LOCK NUT

John Schindel, Aurora, Ill., assignor to Independent Pneumatic Tool Co., Chicago, Ill., a corporation of Delaware Application August 1, 1936, Serial No. 93,818

4 Claims. (Cl. 151—2)

This invention relates to the automatic locking of nuts on screw threads particularly on revolving shafts, studs, chucks, and the like subject to vibrations and where the position of the nut is subject to frequent rotative adjustment along the length of the screw thread.

The object of my invention is to provide a nut which automatically locks itself in any position of rotative adjustment along the length of the screw thread and is held from accidental rotation out of its adjusted position in disregard to vibrations and directional changes of rotation.

The automatic lock nut of my invention is especially useful in the adjustment of tension springs of power driven chucks such as are employed in screw driving, nut setting and stud driving attachments for portable electric or other power operated rotary tools where quick adjustments are essential on account of frequent changes in torque requirements due to different sizes of screws and nuts being driven.

One important feature of my invention is that the locking of the nut to the screw is not affected by clamping the screw threads, which practice tends to distort, destroy, and permanently wear out the screw threads and also prevents free adjustment of the nut along the screw threads.

In accordance with my invention the nut is provided with a spring biased locking disc having a lug or key slidable in a key-way cut lengthwise in the shaft on which the nut is mounted. This disc is also slidably mounted with respect to the nut and has circumferentially spaced projections which cooperate with similarly disposed depressions in the body of the nut. The spring tension on the disc keeps the projections interlocked with the depressions and the nut is held against accidental rotation in its various positions of adjustment.

When desired to adjust the nut along the shaft to a different position so as to vary the tension of the spring with which the nut is associated, the nut is forcibly turned in the direction desired. The projections on the locking disc ride into and out of the depressions in the nut and this action is repeated until the nut has reached the desired position of adjustment along the screw thread. By having a large number of depressions in the body of the nut, the nut can be turned only a few degrees before reaching a new locking position.

The lock nut of my invention is a complete and unitary structure and as such can be screwed on and off the shaft element or other support with which it is employed.

In the accompanying drawing showing the preferred embodiment of my invention:

Fig. 1 shows a screw driving attachment for a portable electric tool in longitudinal section and embodying the automatic lock nut of my invention;

Fig. 2 is a similar view of the lock nut and its associated shaft element on a larger scale;

Fig. 3 is a face view of the nut on its shaft with portions broken away and in section, respectively, to show the spring biased locking disc and the cooperating projections and depressions which hold the nut in its various positions of adjustment;

Fig. 4 is an edge view of the nut, partly in section, to show the knurling which may be employed to facilitate turning the nut;

Fig. 5 is a similar view showing a nut with a smooth edge and provided with one or more holes to receive a pin for turning the nut;

Fig. 6 is an edge view of the spring element employed with the nut in Figs. 1 to 3;

Fig. 7 is a similar view of a corrugated thin spring washer which may be employed for the spring element in the lock nut assembly;

Fig. 8 is a face view of said corrugated washer;

Fig. 9 is an edge view of a flat spring washer which may be employed for the spring element;

Fig. 10 is a face view of said washer; and

Fig. 11 shows a modified form of locking disc 30 to be hereinafter described.

In the drawing, 1 indicates the gear casing of the screw driving attachment. This gear casing is detachably fastened as by screws to the front end of the motor casing of the portable electric or other power driven rotary tool with which the attachment is employed. The casing 1 has a forwardly extending tubular boss 2 in which the spindle 3 of the tool is journaled as shown in Fig. 1. The spindle is driven by the motor of the tool through a gear reduction in the casing 1 as in devices of this character.

The spindle 3 extends beyond the boss 2 and is provided with a clutch member 4 at its outer end. This clutch member is slidably, but non-rotatably mounted on the spindle by suitable means such as a key 5 and balls 6 as shown.

The clutch member 4 cooperates with a clutch member 7 fixed on a driven chuck shaft 8 which is axially aligned with the spindle 3 and carries a screw driving bit 9 at its outer end as shown. The shaft 8 is slidably and rotatably supported by the spindle 3 by having the inner end portion of the shaft extending into the spindle which is made hollow to receive the shaft end. The latter engages a spring means 10 located in the hollow of the spindle, which spring means serves to normally force the shaft outwardly from the spindle to separate the clutch members 4 and 7 when the tool is removed from the work. These clutch members are engaged by pressing the tool against the work and said clutch members are provided on their opposed surfaces with cooperating radial clutch teeth 11, 12 which teeth when interlocked, connect the shaft 8 to the spindle 3 for rotation thereby.

A coiled spring 13 surrounds the spindle between the clutch member 4 and a nut 14. Said nut is mounted on the screw threaded portion 15 of the spindle adjacent the inner end of the spring 13 and serves to hold the spring 13 against the clutch member 4. The nut is also employed to adjust the tension of this spring to regulate the torque at which the clutch members 4 and 7, while engaged, will automatically release the drive of the spindle on the shaft 8 when the screw being set resists the turning of the shaft. The clutch teeth are provided with beveled or inclined side edges whereby the clutch members may have rotative slippage when releasing. The clutch member 4 in this action is forced rearwardly against the spring 13, the key 5 riding in its slot 16 in the spindle 3. The outward movement of the clutch member 4 by the spring 13 is limited by the key 5 engaging the forward end of its slot 16. This holds the clutch member 4 in position to receive the clutch member 7 when the clutch members are engaged on forcing the tool against the work.

The nut 14 in accordance with my invention has a body portion 17 provided at one side with a chamber 18 in which is located a locking disc 19 having an inwardly extending radial lug 20 providing a key for engagement with a longitudinally extending key-way 21 cut in the threaded portion 15 of the spindle 3 or other shaft element on which the nut may be mounted. This key holds the disc 19 against rotation with the nut, yet permits the disc to be carried along with the nut as the nut is turned along the screw threaded portion 15 and also permits lateral sliding movement of the disc with respect to the nut in the chamber 18.

A retaining washer 22 closes the outer end of the chamber 18 and provides a seat for a spring element 23 which is located in the chamber 18 between the disc 19 and the retainer 22.

The spring element, as shown in Figs. 1 to 3 and 6, is in the form of one turn of round steel wire and serves to normally press the locking disc 19 against the nut body at the inner face of its chamber 18. The disc 19 is provided on its inner side with a number of circumferentially spaced projections or protuberances 24 which cooperate with similarly disposed depressions or sockets 25 in the nut body as shown in Figs. 2 and 3. When the projections seat in the depressions, the nut 14 will be held against accidental rotation on its shaft element 3 and be fixed in its position of adjustment along the screw threaded portion 15 of said shaft element.

To adjust the nut along the screw, the nut is forcibly turned in the direction desired and the projections 24 by reason of their semi-circular form ride out of the depressions and reenter the next adjacent depressions as the nut is turned. This produces a clicking sound and the nut can be stopped in any position of its adjustment along the screw and be held in its adjusted position by the interlocking of the projections with the depressions. The projections act in either direction of rotation of the nut, thereby enabling the nut to be adjusted in either direction along the length of the screw and be held in any position of its adjustment against accidental turning.

The projections and the depressions may be equal in number or the depressions may outnumber the projections depending upon the nicety of the adjustment required. In the particular embodiment shown three projections 24 are provided on the locking disc 19 and six depressions 25 are provided in the nut body 17. This gives a considerable number of adjusted positions for the nut in each complete revolution.

The retainer 22 is held in closed relation with respect to the chamber 18 in any manner desired. In the drawing, I have shown the chamber provided with a shoulder to seat the retainer and with the outer edge of the chamber pressed over the outer side of the retainer to hold it in place.

To facilitate turning the nut it may be knurled about its outer cylindrical surface as indicated at 26 in Fig. 4 or if the nut has a plain cylindrical surface a number of holes 27 may be provided in the nut whereby a pin may be engaged with the nut for turning it. The nut may also have hexagonal or other non-circular shape to facilitate turning it. A knurled nut is used in the smaller sizes of screw or nut driving devices which permit of hand adjustment to set the spring tension. The plain or other nut forms are used in the larger devices which require the use of a wrench or like implement to set the spring tension.

In the embodiment shown in Figs. 1 to 3 the projections 24 are formed by indentation. The projections may however be in the form of steel balls 28 as shown in Fig. 11. In this case, two discs 29, 30 are employed in the assembly, one disc 29 is employed to mount the balls and the other disc 30 is employed to take the pressure of the spring element 23 and provide the necessary clearance for the balls to turn in the adjustment of the nut.

In place of the spring wire element 23 I may employ a corrugated thin spring washer 31 as shown in Figs. 7 and 8 or a flat dish-shaped split spring washer 32 as shown in Figs. 9 and 10.

The screw driving attachment shown in Fig. 1 is enclosed in an outer casing 33 which screws its inner end on the boss 2 and is provided at its outer end with a spring pressed sleeve 34 providing a guide and centering means for the driving bit 9. The latter has a releasable pull-out connection with the chuck shaft 8 as shown.

For a nut driving attachment, the construction will be arranged to include a nut engaging socket which would be connected to the forward end of the chuck shaft 8. The spring 10 in separating the clutch members 4 and 7 forces the clutch member 7 against a shoulder provided in the outer casing 33 and thus the work engaging element carried by the shaft 8 will be normally held against rotation when the clutch members are disengaged.

The retainer 22 keeps the locking disc 19 and its spring element in place in the nut, thus providing the nut assembly as a complete and unitary structure which may be screwed on and off the shaft element 3 as shown in the broken lines in Fig. 2. The key-way 21 in the shaft element extends through the end of the shaft as indicated in this figure. When the nut is turned off of the screw threaded portion of the shaft, the locking disc retains its splined connection with the shaft and the nut may be slid laterally off the non-threaded portion of the shaft. In applying the nut, the key of the locking disc is engaged with the key-way 21, and the nut is slid on the shaft until the screw threaded portion is reached, whereupon the nut is turned to engage the threaded portion.

The automatic lock nut of my invention is adaptable for use in any installation where it is desired to adjust a spring tension and hold the tension regardless of vibration. The nut is especially applicable to power driven screw and nut setting devices for portable tools in which the vibrations are more or less severe as the clutch members release many times in the use of such tools in a day's work and at a relatively high speed of rotation.

The details of construction shown and described may be variously changed and modified without departing from the spirit and scope of my invention, except as pointed out in the appended claims.

I claim as my invention:

1. In combination with the releasing clutch of a screw or nut driving device for portable power operated rotary tools, of a spring for regulating the torque at which the clutch releases in the operation of the device, a nut for adjusting the tension of said spring, a shaft for rotating the clutch and having a screw threaded portion to mount the nut, a spring biased locking disc splined on said shaft, said spline extending through one end of the shaft, co-acting means on the disc and the nut and acting automatically on turning the nut in either direction for normally holding the nut in any of its positions of rotative adjustment along the threaded portion of said shaft, and a retainer carried by the nut for holding the disc in assembled relation with the nut and movable therewith as a unit on and off of said shaft.

2. The combination with a support having a screw threaded portion, of a coiled spring associated with said support, a nut mounted on the threaded portion of said support for adjusting the tension of said spring, a locking disc splined on said support, said spline extending through one end of said support, spring means for pressing the disc against the nut, co-operating projections and depressions on the disc and the nut, respectively, for normally holding the nut against turning in either direction in any of its positions of rotative adjustment on the threaded portion of said support, said nut having a chamber to receive the disc and its spring, and a retainer carried by the nut for holding the disc and its spring in said chamber, whereby the parts as a unit may be moved on and off of the shaft with said nut.

3. An automatically locking nut of the character described, comprising as a unitary structure a body portion having formed therein a chamber opening outwardly through one side of said nut body, a locking disc and a spring element located within the confines of said chamber being inserted into said chamber through the open end thereof with the disc against the wall of the nut body at the base of said chamber, a retainer carried by the nut body within said chamber and in fixed position adjacent the outer open end of said chamber for holding the spring against the disc, said spring forcing the disc against the nut body at the base of the chamber, and interlocking projections and depressions on the opposed surfaces of the disc and the nut body for normally holding the nut body against turning in either direction with respect to the disc, the latter having a key to fit in a key way in the mounting provided for the nut, said projections and depressions being disposed about the axis of the nut in spaced relation.

4. In combination with the releasing clutch of a screw or nut driving device for portable motor driven rotary tools, said clutch having separable clutch members with interengageable clutch teeth, of a spring for regulating the torque at which the clutch teeth when engaged release in the operation of the clutch, a nut for adjusting the tension of said spring, a shaft for rotating the clutch members and having a screw threaded portion to mount the nut, and means interconnected with the nut and the shaft and acting automatically on turning the nut for normally holding the nut against rotation in either direction in any of its positions of rotative adjustment on the threaded portion of said shaft, said means being carried by the nut and movable therewith along the shaft and on and off the same as a unit.

JOHN SCHINDEL.